United States Patent
Kim et al.

(10) Patent No.: US 12,405,376 B2
(45) Date of Patent: Sep. 2, 2025

(54) SPAD IMAGE SENSOR

(71) Applicant: Samsung Electronics Co., Ltd., Suwon-si (KR)

(72) Inventors: Kwang Oh Kim, Cerritos, CA (US); Yibing Michelle Wang, Temple City, CA (US); Chunji Wang, Pasadena, CA (US); Hongyu Wang, San Gabriel, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 970 days.

(21) Appl. No.: 17/499,857

(22) Filed: Oct. 12, 2021

(65) Prior Publication Data

US 2023/0030480 A1   Feb. 2, 2023

Related U.S. Application Data

(60) Provisional application No. 63/226,157, filed on Jul. 27, 2021.

(51) Int. Cl.
  G01S 7/4865    (2020.01)
  G01S 7/4861    (2020.01)
  (Continued)

(52) U.S. Cl.
  CPC ............ G01S 17/10 (2013.01); G01S 7/4861 (2013.01); G01S 7/4865 (2013.01); G04F 10/005 (2013.01); H04N 25/75 (2023.01)

(58) Field of Classification Search
  CPC .............................. G01S 7/4865; G04F 10/005
  See application file for complete search history.

(56) References Cited

U.S. PATENT DOCUMENTS 10,132,616 B2    11/2018   Wang
10,416,293 B2    9/2019    Buckley et al.
(Continued)

FOREIGN PATENT DOCUMENTS

CN    111830530 A    10/2020
CN    111929662 A    11/2020
(Continued)

OTHER PUBLICATIONS

Henderson, Robert K. et al., "A 192x128 Time Correlated SPAD Image Sensor in 40-nm CMOS Technology", IEEE Journal of Solid-State Circuits, vol. 54, No. 7, 2019, pp. 1907-1916.
(Continued)

Primary Examiner — Thanh Luu
(74) Attorney, Agent, or Firm — Renaissance IP Law Group LLP

(57) ABSTRACT

A LiDAR system is disclosed that includes a SPAD unit array and J read group (RG) channels. The SPAD unit array is arranged in M rows and N columns of pixel read groups. Each row includes K pixel read groups. Each pixel read group outputs a detection signal in response to a light pulse that is incident on the pixel read group. Each RG channel corresponds to at least one row of pixel read groups and includes L time-to-digital converters that respectively generate timestamp information corresponding to detection event signals of each of L pixel read groups in the at least one row of pixel read groups in which J<M and L≤K. Each RG channel stores the timestamp information in an accumulator bin of a histogram circuit corresponding to a value of the timestamp information using hardwired addressing based on the value of the timestamp information.

19 Claims, 8 Drawing Sheets

(51) Int. Cl.
*G01S 17/10* (2020.01)
*G04F 10/00* (2006.01)
*H04N 25/75* (2023.01)

(56) References Cited

U.S. PATENT DOCUMENTS

| | | |
|---|---|---|
| 10,801,886 B2 | 10/2020 | Mandai et al. |
| 10,962,628 B1 | 3/2021 | Laifenfeld et al. |
| 2017/0047363 A1 | 2/2017 | Choi et al. |
| 2018/0164415 A1* | 6/2018 | Buckley ............... G01S 17/18 |
| 2019/0250257 A1 | 8/2019 | Finkelstein et al. |
| 2020/0116838 A1 | 4/2020 | Erdogan et al. |
| 2020/0233066 A1 | 7/2020 | Kulesh et al. |
| 2020/0233068 A1 | 7/2020 | Henderson et al. |
| 2020/0284883 A1 | 9/2020 | Ferreira et al. |
| 2021/0109199 A1 | 4/2021 | Hennecke et al. |
| 2022/0221562 A1* | 7/2022 | Wang ............... G01S 7/4814 |

FOREIGN PATENT DOCUMENTS

| | | |
|---|---|---|
| CN | 112558096 A | 3/2021 |
| JP | 2010114834 A | 5/2010 |
| WO | 2020253968 A1 | 12/2020 |
| WO | 2021026241 A1 | 2/2021 |

OTHER PUBLICATIONS

Hutchings, Sam W. et al., "A Reconfigurable 3-D-Stacked SPAD Imager with In-Pixel Histogramming for Flash LIDAR or High-Speed Time-of-Flight Imaging", IEEE Journal of Solid-State Circuits, vol. 54, No. 11, 2019, pp. 2947-2956.

Dutton, Neale A. W. et al., "A Time-Correlated Single-Photon-Counting Sensor with 14GS/s Histogramming Time-to-Digital Converter," 2015 IEEE International Solid-State Circuits Conference (ISSCC), Digest of Technical Papers, ISSCC 2015, Session 11, Sensors and Imagers for Life Sciences, 11.5, 2015, 3 pages.

European Extended Search Report for Application No. 22178085.1, mailed Nov. 18, 2022.

* cited by examiner

SPAD IMAGE SENSOR

CROSS-REFERENCE TO RELATED APPLICATION

This application claims the priority benefit under 35 U.S.C. § 119(e) of U.S. Provisional Application No. 63/226,157, filed on Jul. 27, 2021, the disclosure of which is incorporated herein by reference in its entirety.

TECHNICAL FIELD

The subject matter disclosed herein relates to Light Detection and Ranging (LiDAR) systems. More particularly, the subject matter disclosed here relates to a LiDAR system that includes a readout architecture that provides an automatic illuminated spot detection feature and that enables on-chip histogram and peak-intensity detection by using reading-group (RG) units.

BACKGROUND

High-quality depth information for mid-ranges (up to 10 m) is highly desirable for mobile applications that implement augmented/virtual (AR/VR) applications. A typical direct time-of-flight (dToF) LiDAR system using single-photon avalanche diodes (SPADs) may have difficulty out-of-doors because outside ambient light tends to deteriorate histogram quality. To compensate for strong ambient light, a relatively greater optical power may be used, but greater optical power is contrary to a low-power operation for a mobile application.

On-chip histogram and peak detection generation may generate large quantities of data, which also may be contrary to a low-power operation for a mobile application. Typical techniques that provide on-chip histogram and peak-detection circuitry use a large memory and a correspondingly large circuit area. Moreover, reading an entire pixel array to reduce latency requires a large number of time-to-digital converters (TDCs), which also uses a large chip area for the TDCs, consumes a relatively large amount of power, and uses a large memory to generate a histogram. Thus, an extremely high-speed interface is needed for outputting RAW data from an entire pixel area.

SUMMARY

An example embodiment provides a LiDAR system that may include SPAD array and a read group (RG) channel. The SPAD array may include at least one pixel read group that outputs a detection event signal in response to a light pulse that is incident on the at least one pixel read group. The RG channel may be coupled to the at least one pixel read group in which the RG channel may include a TDC configured to generate timestamp information corresponding to the detection event signal, and the RG channel may be further configured to store the timestamp information in an accumulator bin of a histogram circuit corresponding to a value of the timestamp information using hardwired addressing based on the value of the timestamp information. In one embodiment, the SPAD array may include M rows of pixel read groups and N columns of pixel read groups in which M and N may be integers that are greater than 0, and each row of pixel read groups may include K pixel read groups in which K comprises an integer that is greater than 0, and the LiDAR system may further include M RG channels in which each RG channel corresponds to a row of pixel read groups and generates timestamp information for L pixel read groups in the row of pixel read groups in which L may be an integer that is greater than 0 and L≤K. In another embodiment, the SPAD array may include M rows of pixel read groups and N columns of pixel read groups in which M and N may be integers that are greater than 0, and each row of pixel read groups may include K pixel read groups in which K may be an integer that is greater than 0, and the LiDAR system may further include J RG channels in which J may be an integer that is greater than 0 and J<M in which each RG channel corresponds to at least one row of pixel read groups and generates timestamp information for L pixel read groups in the at least one row of pixel read groups in which L is an integer that is greater than 0 and L≤K. In yet another embodiment, J=M/2, and the J RG channels may generate timestamp information for pixel read groups in J=odd pixel read group rows and for pixel read groups in J=even pixel read group rows in alternating read cycles. In still another embodiment, the SPAD array may include M rows of pixel read groups and N columns of pixel read groups in which M and N may be integers that are greater than 0, and each row of pixel read groups may include K pixel read groups in which K may be an integer that is greater than 0, the pixel read groups of the SPAD array being arranged in a zigzag pattern. In one embodiment, the at least one pixel read group may include two or more SPAD units, and the RG channel may further include a detection circuit configured to detect which SPAD unit of the at least one pixel read group outputs a largest intensity signal for the light pulse that is incident on the at least one pixel read group and couples the largest intensity signal to the TDC of the RG channel. In another embodiment, the LiDAR system may further include a peak-detection circuit configured to output an indication of the accumulator bin of the histogram circuit that stores a largest accumulation value. In still another embodiment, the LiDAR system may further include a correlation filter circuit at an input of the histogram circuit that may be enabled based on an intensity of the detection event signal exceeding a predetermined threshold.

An example embodiment provides a LiDAR system that may include an array of SPAD units and J RG channels. The array of SPAD units may be arranged in M rows of pixel read groups and N columns of pixel read groups in which each row of pixel read groups may include K pixel read groups in which M, N and K may be integers that are greater than 0 and in which each pixel read group may be configured to output a detection event signal in response to a light pulse that is incident on the pixel read group. Each RG channel corresponds to at least one row of pixel read groups and may include L TDCs that are respectively configured to generate timestamp information corresponding to detection event signals of each of L pixel read groups in the at least one row of pixel read groups in which J and L may be integers that are greater than 0, J<M and L≤K, and each RG channel may be further configured to store the timestamp information in an accumulator bin of a histogram circuit corresponding to a value of the timestamp information using hardwired addressing based on the value of the timestamp information. In one embodiment, J=M. In another embodiment, J=M/2, and the J RG channels generate timestamp information for pixel read groups in J=odd pixel read group rows and for pixel read groups in J=even pixel read group rows in alternating read cycles. In still another embodiment, the pixel read groups of the SPAD array may be arranged in a zigzag pattern. In yet another embodiment, at least one pixel read group may include two or more SPAD units, and the RG channel corresponding to the at least one pixel read group may further include a detection circuit that may be configured to detect which SPAD unit of the at least one pixel read group outputs a largest intensity signal for the light pulse that is incident on the at least one pixel read group and couples the largest intensity signal to the TDC of the RG channel. In one embodiment, the LiDAR system may further include a peak-detection circuit that may be configured to output an indication of the accumulator bin of the histogram circuit that stores a largest accumulation value. In another embodiment, the LiDAR system may further include a correlation filter circuit at an input of the histogram circuit that is enabled based on an intensity of the detection event signal exceeding a predetermined threshold.

An example embodiment provides a LiDAR system that may include a SPAD array and a read group (RG) channel. The SPAD array may include at least one pixel read group that outputs a detection event signal in response to a light pulse that is incident on the at least one pixel read group in which the at least one pixel read group may include two or more SPAD units. The RG channel may be coupled to the at least one pixel read group, and the RG channel may include a detection circuit configured to detect which SPAD unit of the at least one pixel read group outputs a largest intensity signal for the light pulse that is incident on the at least one pixel read group, and TDC that may be configured to generate timestamp information corresponding to the largest intensity signal and store the timestamp information in an accumulator bin of a histogram circuit corresponding to a value of the timestamp information using hardwired addressing based on the value of the timestamp information. In one embodiment, the SPAD array may include M rows of pixel read groups and N columns of pixel read groups in which M and N may be integers that are greater than 0, and each row of pixel read groups may include K pixel read groups in which K may include an integer that is greater than 0, and the LiDAR system may further include M RG channels in which each RG channel corresponds to a row of pixel read groups and generates timestamp information for L pixel read groups in the row of pixel read groups in which L may be an integer that is greater than 0 and L≤K. In another embodiment, the SPAD array may include M rows of pixel read groups and N columns of pixel read groups in which M and N may be integers that are greater than 0, and each row of pixel read groups may include K pixel read groups in which K may be an integer that is greater than 0, and in which the LiDAR system may further include J RG channels in which J may be an integer that is greater than 0 and J<M, and each RG channel corresponds to at least one row of pixel read groups and generates timestamp information for L pixel read groups in the at least one row of pixel read groups in which L may be an integer that is greater than 0 and L≤K. In still another embodiment, J=M/2, and the J RG channels generate timestamp information for pixel read groups in J=odd pixel read group rows and for pixel read groups in J=even pixel read group rows in alternating read cycles. In yet another embodiment, the LiDAR system may further include a peak-detection circuit configured to output an indication of the accumulator bin of the histogram circuit that stores a largest accumulation value; and a correlation filter circuit at an input of the histogram circuit that may be enabled based on an intensity of the detection event signal exceeding a predetermined threshold.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1A:
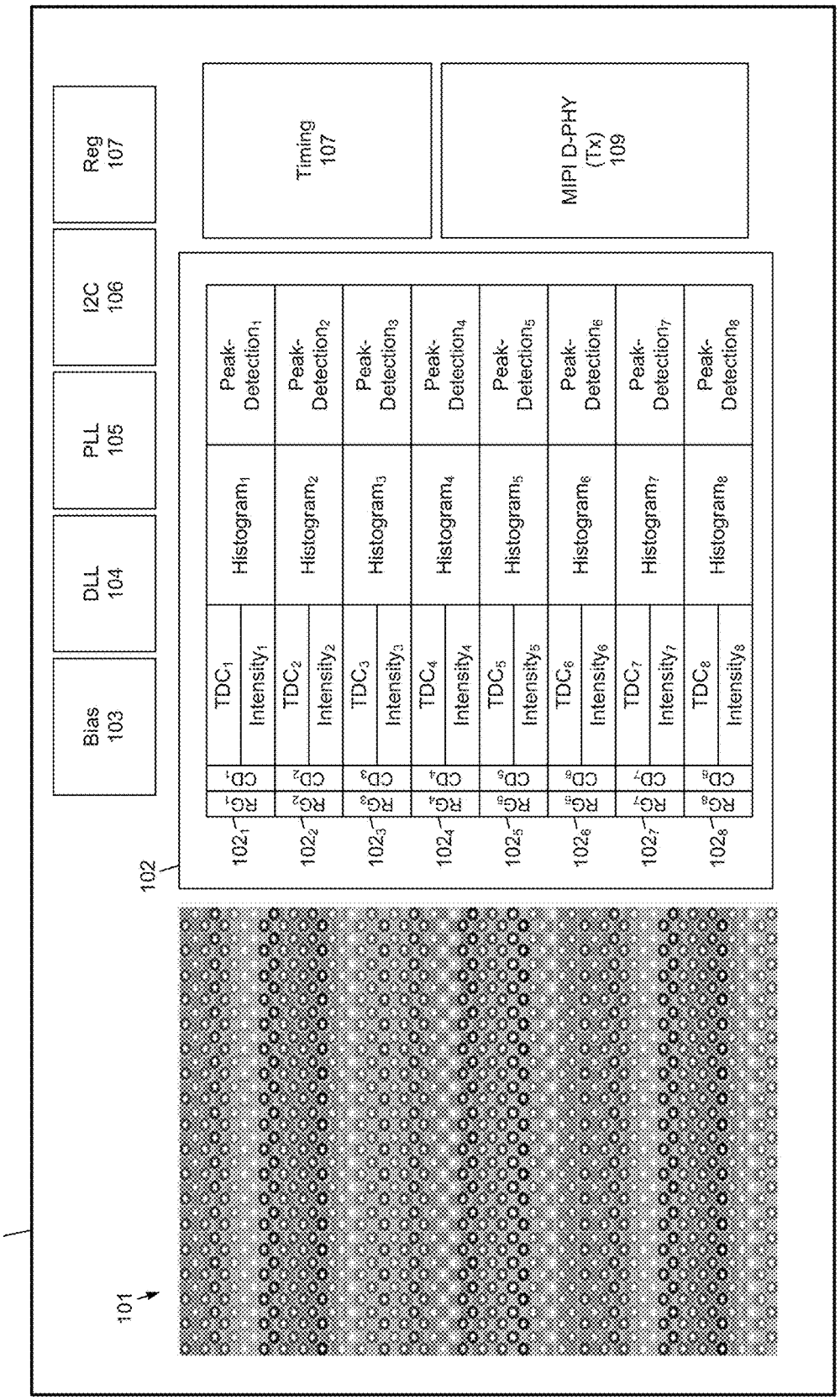
FIG. 1A depicts a first example configuration of an example embodiment of a frequency-modulated continuous-wave LiDAR system according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

The subject matter disclosed herein provides a LiDAR system having a readout architecture that provides an automatic illuminated spot detection feature and that enables on-chip histogram and peak-intensity detection by using reading-group (RG) units. The RG units use a reduced number of TDCs, which minimizes circuitry area and power consumption. A reduced number of histogram bins are also used, which further minimizes circuitry area and power consumption. Thus, the low-power, high-speed readout architecture provides depth information without significant delay. The readout architecture may also remove ambient light effects, which increases detection range. Additionally, a dynamic correlation filter (e.g., box-filter) function may be used to improve detection range for distances greater than about 10 m. The dynamic correlation-filter function also has an automatic on/off operation mode that does not deteriorate range-measurement quality at shorter distances for very strong signals.

The subject matter disclosed herein also provides a histogram technique that uses a reduced coarse bin size and hard-wired decoded addresses rather than a memory to count events for each bin. An accumulator (counter) counts events for each coarse bin. A coarse correlation filter may be used prior to the histogram bins. Fine bin accumulation is provided by counting incoming event signals at a global level for a highest peak coarse bin only by using a fine correlation filter for incoming event signals highest peak coarse bin incoming signal.

FIG. 1A depicts a first example configuration of an example embodiment of a frequency-modulated continuous-wave (FMCW) LiDAR system 100 according to the subject matter disclosed herein. The LiDAR system 100 may include a SPAD pixel array 101, Read-Group Channels (RGCs) 102, bias circuitry 103, a delay-locked loop (DLL) 104, a phase-locked loop (PLL) 105, an I2C communication interface 106, a power regulator 107, timing circuitry 108, and a Mobile Industry Processor (MIPI) D-Phy interface 109. In one embodiment, the various components of the LiDAR system 100 may be embodied as modules.

Figure 1B:
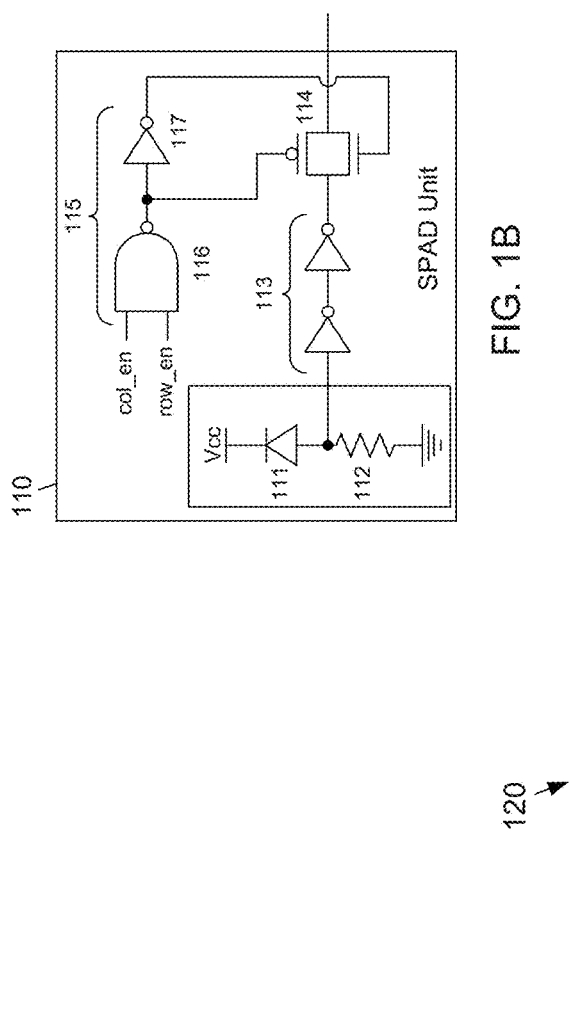
FIG. 1B depicts a schematic block diagram of an example embodiment of a SPAD unit according to the subject matter disclosed herein.

The SPAD pixel array 101 may include a 2D array of SPAD units 110. FIG. 1B depicts a schematic block diagram of an example embodiment of a SPAD unit 110 according to the subject matter disclosed herein. As used herein, the terms SPAD unit and SPAD pixel are interchangeable. A SPAD unit 110 may include a SPAD 111, a resistor 112, a level-shifting and signal conditioning circuit 113, a switch 114 and an enable circuit 115. A cathode terminal of the SPAD 111 may be coupled to a voltage source Vcc, and an anode terminal of the SPAD 111 may be coupled to a first terminal of the resistor 112. A second terminal of the resistor 112 may be coupled to a ground node. The anode of the SPAD 111 and the first terminal of the resistor 112 may be coupled to an input of the level-shifting and conditioning circuit 113. An output of the level-shifting and conditioning circuit 113 may be coupled to an input to the switch 114. The enable circuit 115 may include an AND gate 116 and an inverter 117. The AND gate 116 may receive a column enable signal col_en and a row enable signal row_en. The output of the AND gate 116 and the output of the inverter 117 are respectively coupled to the two different control inputs to the switch 114.

The SPAD pixel array 101 may use SPAD pixels that are configured for pixel sharing by using an n+ buried layer that increases pixel fill-factor while also minimizing a multiplication region to reduce dark count rate (DCR). Metal-filled deep trench isolation regions may be used between groups of shared pixels to reduce crosstalk. Additionally, the SPAD units 110 may be front-side illuminated (FSI) or back-side illuminated (BSI) pixels, which allows FSI/BSI stacking fabrication processes.

Returning to FIG. 1A, the RGCs 102 are depicted as including eight channels of read groups (RGs) $102_1$-$102_8$, however, it should be understood that RGCs 102 may include more or fewer than eight channels. Each RG channel $102_i$ in FIG. 1A may be associated with one or more pixel read groups (PRGs). A PRG is represented in FIG. 1A as an oval shape in the SPAD array 101. A PRG may be a formed from one or more small blocks of SPAD units 110, such as a 2×2, a 4×3, a 4×4, or a 6×8 blocks of SPAD units 110, of the SPAD array 101. In one embodiment, the SPAD units of a single PRG that is formed by multiple SPAD units 110 may be configured for pixel sharing. In some embodiments, a PRG may be a single SPAD unit 110. Other sizes of PRGs are also possible.

Each RG channel $102_i$ may include a read-group (RG) detector that detects illuminated regions of the SPAD array 101 using an intensity counter. Each RG channel $102_i$ may also include a global coincident detector (CD) that detects a signal intensity that exceeds a threshold. A TDC converts photon-detection events into a digital time stamp, and an intensity circuit enables or disables a correlation (Box) filter. A histogram circuit generates a histogram of detected events, and a peak-detection circuit, which may be part of the histogram circuit in one embodiment, detects peak values of the histograms. It should be understood that a RG channel $102_i$ may also include additional circuitry that may not be shown in FIG. 1A.

The bias circuitry 103, the DLL 104, the PLL 105, the I2C communication interface 106, the power regulator 107, the timing circuitry 108, and the MIPI D-Phy interface 109 may provide infrastructure support for the LiDAR system 100 and may be located on the same chip (or die) as the SPAD pixel array 101, as depicted in FIG. 1A.

Figure 1C:
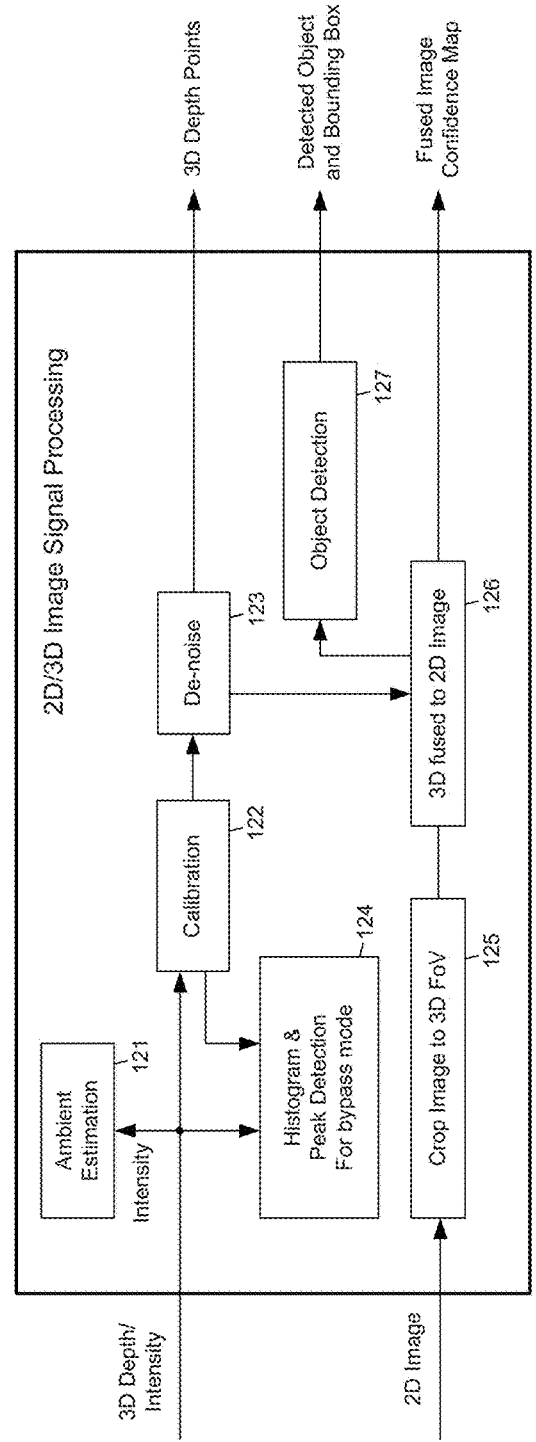
FIG. 1C is a functional block diagram of an image signal processing block according to the subject matter disclosed herein.

For the first example configuration of the LiDAR system 100, a 2D/3D image signal processing (ISP) block may be located on a chip separate from the components depicted in FIG. 1A. FIG. 1C is a functional block diagram of an ISP block 120 according to the subject matter disclosed herein. The ISP block 120 may include an ambient estimation block 121, a calibration block 122, a denoising block 123, a histogram and peak detection block 124, an image cropping to 3D field of view (FOV) block 125, a 3D fused to 2D image block 126, and an object detection block 127.

Figure 1D:
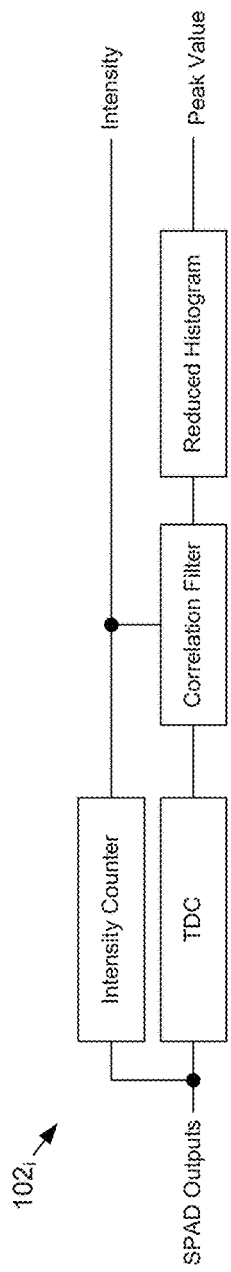
FIG. 1D depicts a block diagram of an example embodiment of a portion of a RG channel that includes the TDC, the intensity counter, the histogram and peak-detection circuits according to the subject matter disclosed herein.

FIG. 1D depicts a block diagram of an example embodiment of a portion of a RG channel that includes the TDC, the intensity counter, the histogram and peak-detection circuits according to the subject matter disclosed herein. The TDC and the intensity counter receive RGP outputs. The TDC generates timestamp data for the RGP outputs. The intensity counter generates a count of photon-detection events that may be used to enable a coarse correlation filter to improve histogram quality for a weak signal. When enabled, the coarse correlation filter gates timestamp data that is input to the histogram circuit. The histogram circuit accumulates the timestamp data into bins and determines a bin having a peak value. After a course peak-value bin has been determined, a fine correlation filter may be used at a global level for only the highest peak (coarse) bin by using a fine correlation filter for incoming event signals highest peak coarse bin incoming signal.

Figure 1E:
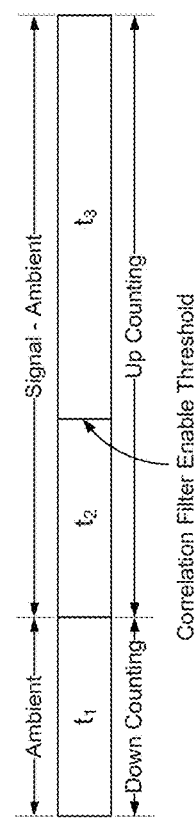
FIG. 1E depicts an example time sequence that may be used for estimating an ambient intensity level according to the subject matter disclosed herein.

The intensity counter may be configured to count photon-detection events output from a PRG. FIG. 1E depicts an example time sequence 130 that may be used for estimating an ambient intensity level. During a first predetermined time period $t_1$, the intensity counter is set to count down, and counts photon-detection events with the LiDAR laser being inactive (i.e., not powered). The first predetermined time period $t_1$ may span a few hundred to a few thousand cycles of a 3D measurement. During a second time period $t_2$ that is equal to time period $t_1$, the intensity counter is set to count up, and counts photon-detection events with the LiDAR laser in an active mode (i.e., powered) making 3D measurements. If the count of photon-detection events at the end of the second time period $t_2$ exceeds a predetermined threshold, the correlation filter may be enabled that gates then input to the histogram circuit. At the end of a time period $t_3$, the intensity counter contains an intensity level for a complete 3D measurement cycle minus the ambient intensity level measured at the end of time period $t_1$.

Figure 1F:
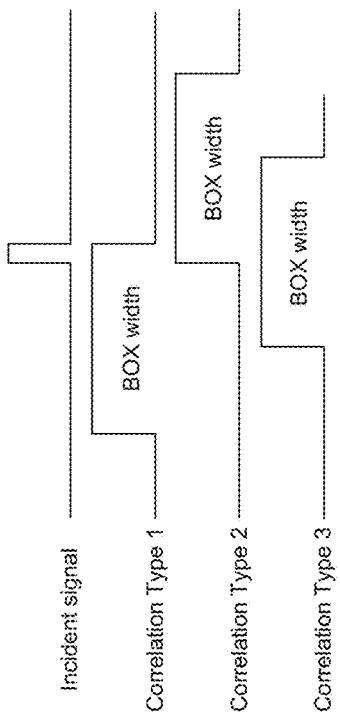
FIG. 1F depicts three example types of correlation filter gating configurations with respect to a width of a fine histogram bin according to the subject matter disclosed herein.

FIG. 1F depicts three example types of correlation filter gating configurations with respect to a width of a fine histogram bin (box width) according to the subject matter disclosed herein. The width of the fine histogram bin is shown along an incident signal time line for reference purposes. The gating width of all three types of correlation filters may be adjustable to provide optimum correlation filtering. While a peak bin for a coarse histogram is being determined, a coarse correlation filter may be used. After a peak bin has been determined, a fine correlation filter may be used.

A Type 1 correlation filter may be aligned so that the falling edge of the gating width corresponds to a maximum ToF that the correlation filter is expected to pass, and is shown with respect to the fine histogram bin for an expected example maximum ToF for the corresponding degree of coarse/fine of the peak detection. A Type 2 correlation filter may be aligned so that the rising edge of the gating width corresponds to a minimum ToF that the correlation filter is expected to pass, and is shown with respect to the fine histogram bin for an expected example minimum ToF for the corresponding degree of coarse/fine of the peak detection. A Type 3 correlation filter may be aligned to straddle a nominal ToF that the correlation filter is expected to pass for the corresponding degree of coarse/fine of the peak detection.

The histogram circuit may use accumulators having hardwired addressing instead a histogram memory. In one embodiment, the histogram circuit for a RG channel may include 128 bins. The hardwired addressing stores a ToF value output from the TDC into an appropriate bin based on the ToF value. That is, different ranges of ToF values are directed to correspondingly different histogram bins using hardwired addressing based on the ToF value. Peak detection may be provided by a global comparison of a previous peak-value accumulator bin with incoming timestamps to determine an updated location of the accumulator bin having a peak value. When a peak-value accumulator reaches a threshold value, a predetermined value is subtracted from all accumulator bins to reduce the bit depth of the accumulators.

Figure 1G:
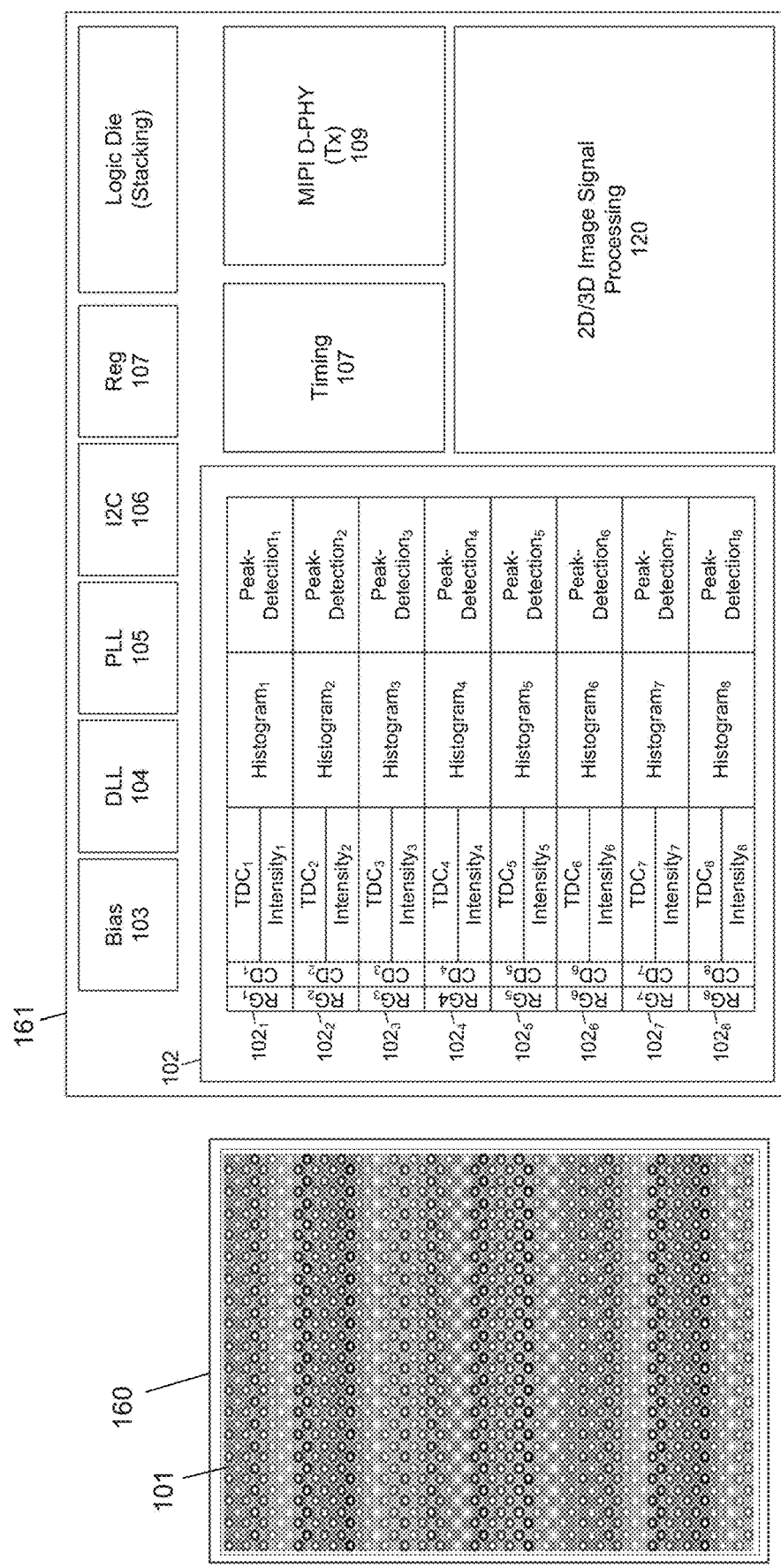
FIG. 1G depicts a second example configuration of the LiDAR system according to the subject matter disclosed herein.

FIG. 1G depicts a second example configuration of the LiDAR system 100 in which the SPAD array 101 may be located on a first chip 160 and the other components depicted in FIG. 1A including the 2D/3D ISP block 120 are located on a second chip 161. This is in contrast to the SPAD array 101 and the other components depicted in FIG. 1A, which are located on a chip 150 and in which the ISP block 120 is located on a second chip (not indicated). The second example configuration depicted in FIG. 1G may be embodied as a chip-to-chip (C2C) configuration. Similar to the first example configuration of the LiDAR system 100, the SPAD units for the second example configuration may be front-side illuminated (FSI) or back-side illuminated (BSI) pixels.

Figure 2A:
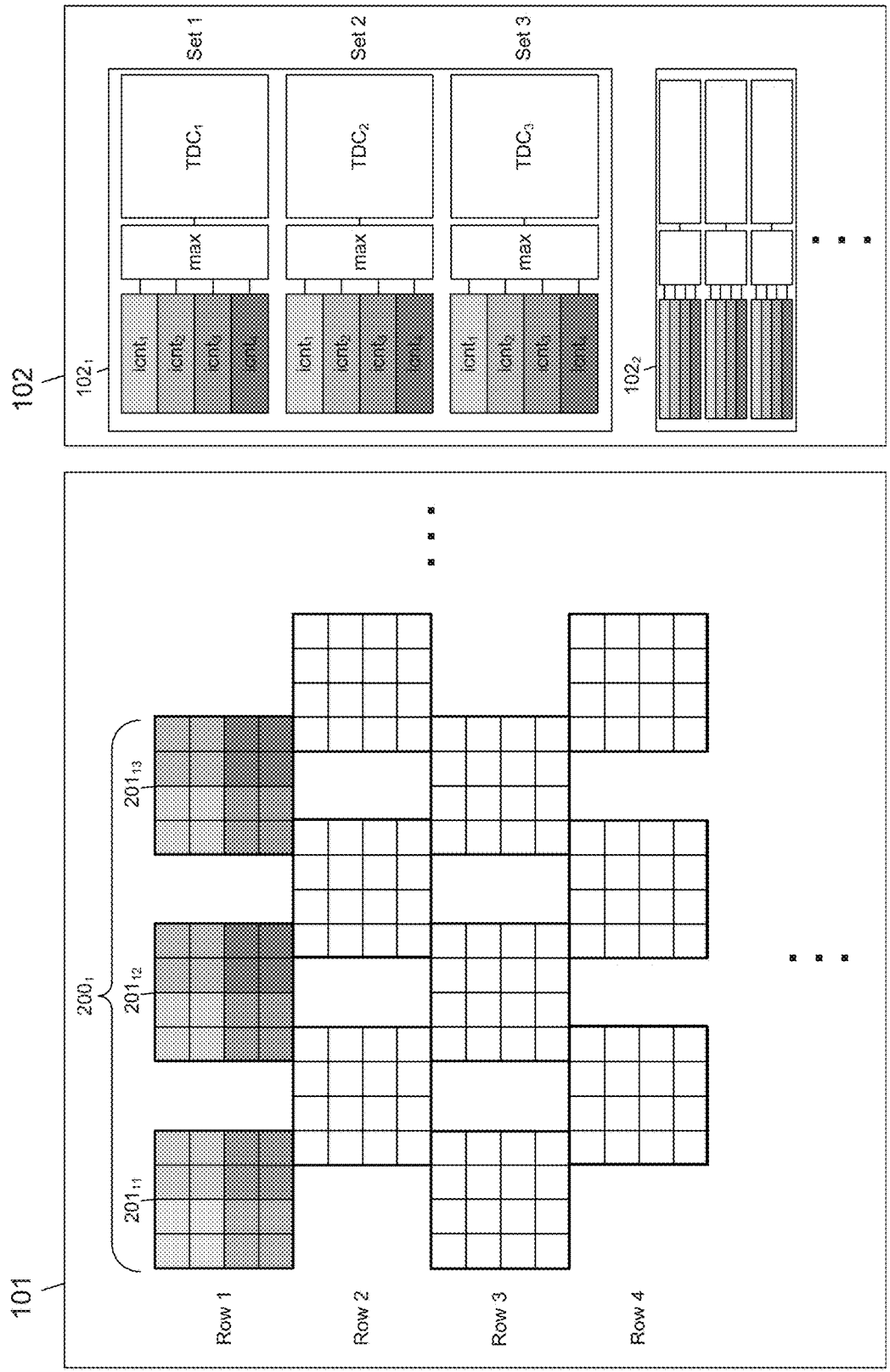
FIGS. 2A and 2B depict a first example organizational arrangement of pixel read groups of the SPAD array and channels of the read-group channels according to the subject matter disclosed herein.
Figure 2B:
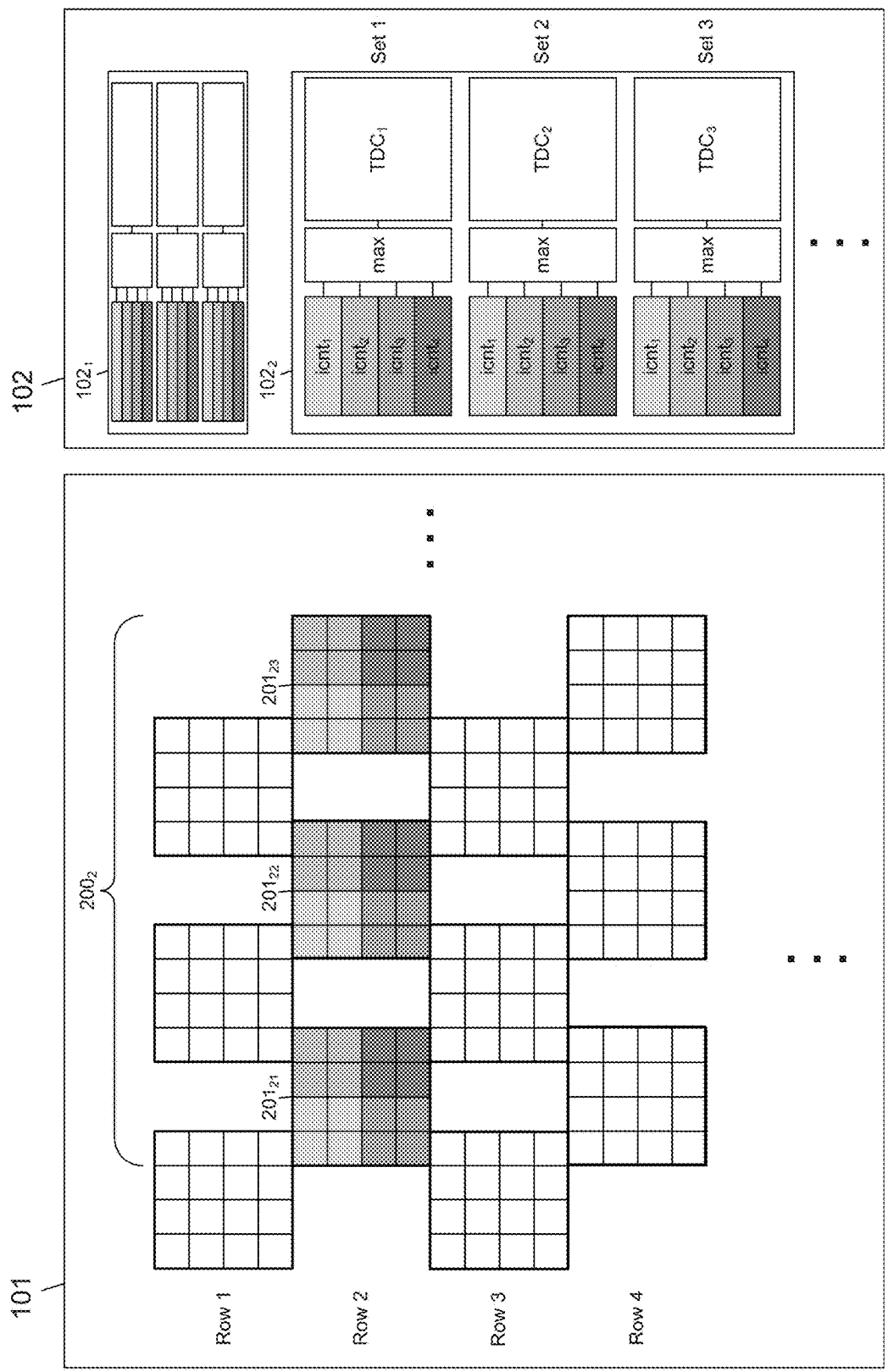
Figure 4:
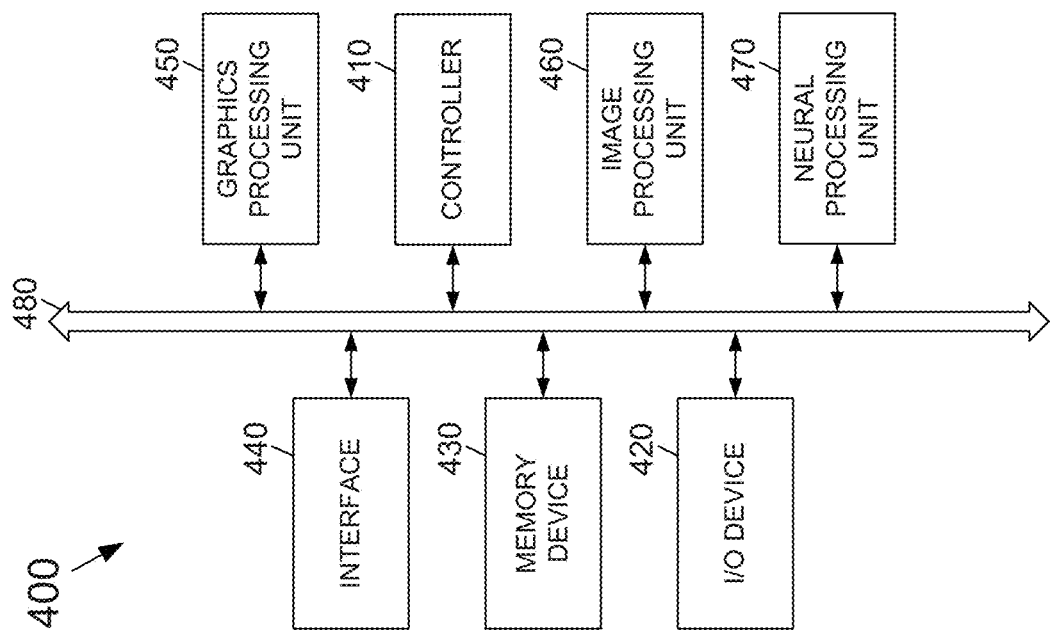
FIG. 4 depicts an electronic device that includes having a readout architecture that provides an automatic illuminated spot detection feature and that enables on-chip histogram and peak-intensity detection by using RG units. according to the subject matter disclosed herein.

FIGS. 2A and 2B depict a first example organizational arrangement of PRGs of the SPAD array 101 and channels of the read-group channels 102 according to the subject matter disclosed herein. As depicted in FIG. 2A, 4×4 blocks of SPAD units form a single PRG 201. Three PRGs $201_{11}$-$201_{13}$ that are in the first three columns of a PRG row 1 of the SPAD array 101 are grouped together to form a PRG $200_1$ that is associated with a read-group channel $102_1$ of the RGC 102. That is, the PRG $200_1$, which includes three PRGs $201_{11}$-$201_{13}$, is associated with RG channel $102_1$.

For this organizational example, each 4×4 block of SPAD units is formed by four 2×2 smaller blocks of SPAD units. The SPAD units of the 2×2 blocks may be configured for pixel sharing so that when a 2×2 block is selected, the output the combination of all four SPAD units forming the 2×2 block. In one embodiment, the PRGs of the pixel array 101 may be arranged in a zig-zag, or checkerboard, pattern to maximize spatial resolution of the pixel array. In another embodiment, the SPAD pixels of the pixel array may be arranged in a zig-zag pattern. In still other embodiments, the pixels and/or the PRGs of a pixel array may be arranged in square or rectangular patterns.

FIG. 2B depicts three PRGs $201_{21}$-$201_{23}$ that form a PRG $200_2$ in the first three columns of a PRG row 2 of the SPAD array 101. The PRG $200_2$ is associated with a RG channel 1022. Generally, a $PRG_i$ that is formed by three PRGs in each row$_i$ is associated with a RG channel $102i$. The association is repeated for all PRG rows of the pixel array 101, although not specifically shown. That is, for this example organizational arrangement, a RG channel corresponds to each row of PRGs of the pixel array 101. In another example embodiment, there may be fewer read-channel groups $102_i$ than there are rows of pixels in the pixel array 101, in which case a row decoder may be used to access/associate all or selected rows of the pixel array 101 with a RG channel. It should be also noted that all of the SPAD units depicted in FIGS. 2A and 2B form part of a PRG. In some embodiments, only some of the SPAD units may be part of a PRG.

Each RG channel $102_i$ includes three sets (Sets 1-3) of intensity counters, maximum (max) intensity detectors, and TDCs. Each Set includes four intensity counters $icnt_1$-$icnt_4$. Each intensity counter $icnt_1$ of a Set is coupled to a 2×2 block of SPAD units, as indicated by corresponding shades of gray. Each respective intensity counter $icnt_1$ of a Set detects a level of intensity (events) detected by the corresponding 2×2 SPAD unit block. The max detection circuit selects the 2×2 SPAD unit block having the maximum intensity based on count values in the intensity counters $icnt_1$-$icnt_4$. The TDC of each Set converts a time associated with the maximum event count to a digital time stamp.

In a first read cycle, PRGs formed by 4×4 blocks of SPAD units in each of the first three columns (i.e., columns 1-3) in each row of PRGs are read to determine whether a 4×4 block of SPAD units in a row detects an object. A read cycle also includes processing by the circuitry shown in FIG. 1D. In a second read cycle, PRGs formed by 4×4 blocks of SPAD units in each of the next three columns (i.e., columns 4-6) in each row of PRGs are read to determine whether the read group of SPAD units in the next three columns of a row detects an object. The read cycles continue until all columns have been read. In one embodiment, the read cycles may be repeated, for example, a few hundred to a few thousand times, to provide filtering by averaging.

Figure 3:
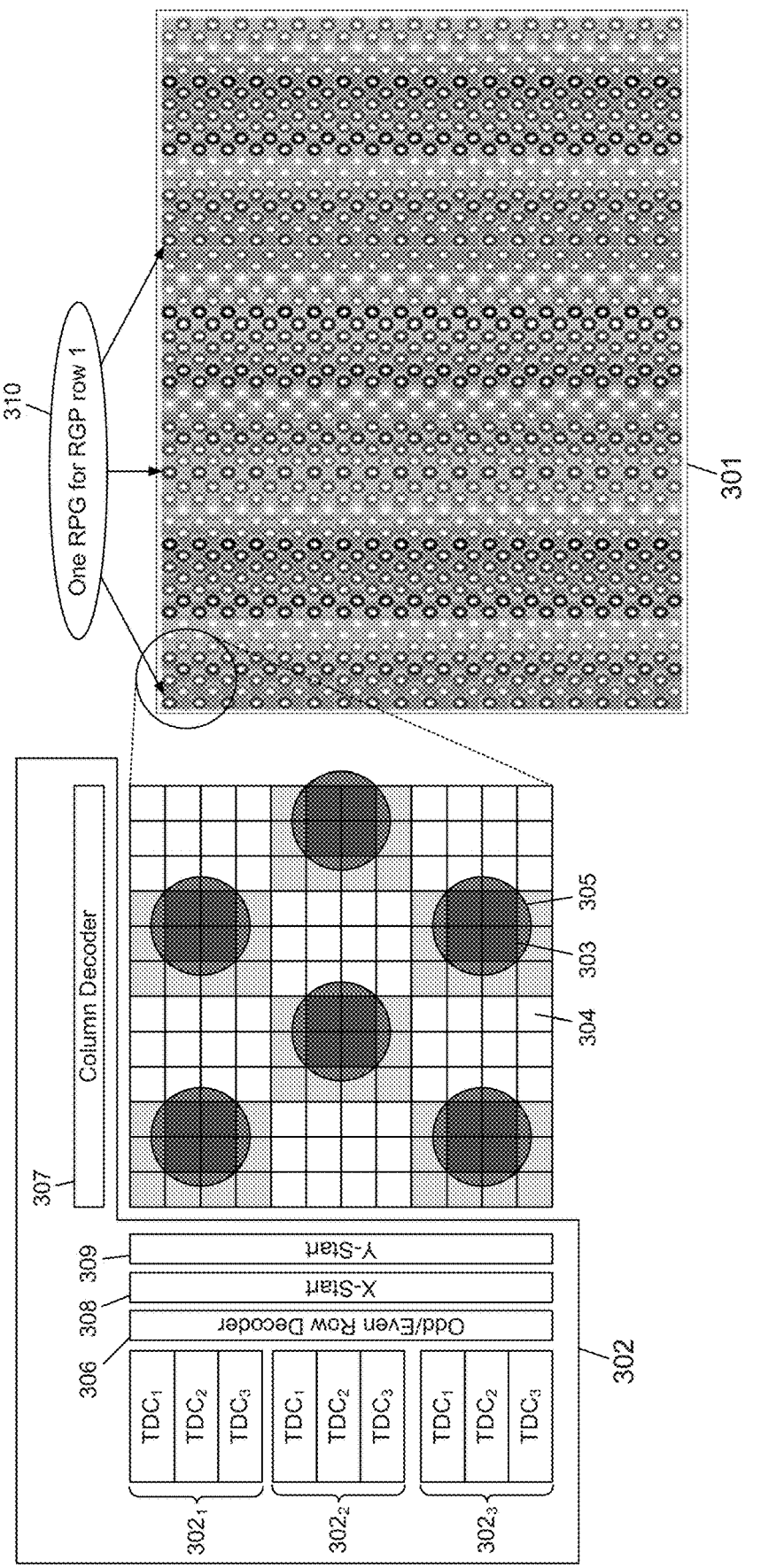
FIG. 3 depicts a second example organizational arrangement of pixel read groups of a SPAD array and channels of a read-group circuitry according to the subject matter disclosed herein.

FIG. 3 depicts a second example organizational arrangement of PRGs of a SPAD array 301 and channels of a read-group circuitry 302 according to the subject matter disclosed herein. The SPAD array 301 may be configured to include a 36×60 array of PRGs 303 in which each PRG is formed from 2×2 blocks of SPAD units 304. The 2×2 SPAD unit blocks 304 may be configured for pixel sharing.

As depicted in the enlarged portion of FIG. 3, each 2×2 block of SPAD units 304 that forms a PRG 303 may be surrounded by other SPAD units 304 of the array that are not part of a PRG 303. For this example embodiment, there are 18 odd-numbered rows of PRGs, 18 even-numbered rows of PRGs, and 18 RG channels $302_1$-$302_{18}$, of which only three PRG rows and three RG channels $302_1$-$302_3$ are shown. The three PRG rows that are shown are odd-numbered PRG rows 1 and 3, and even-numbered PRG row 2.

This example organizational arrangement differs from the first organizational arrangement depicted in FIGS. 2A and 2B by the three PRGs 303 not being immediately adjacent to each other. Instead, for this embodiment, the three PRGs 303 may be physically separated from each other along the PRG row by a predetermined number of intervening PRGs 303. For the example depicted in FIG. 3, the PRGs 303 are separated by ten (10) PRGs. The PRGs 303 may also be arranged in a zig-zag pattern to maximize spatial resolution of the PRGs of the SPAD array 301.

The 2×2 SPAD unit blocks forming a PRG 303 are represented in FIG. 3 by darkened squares. Optics that are part of a LiDAR system, but are not shown, may be configured to focus light onto selected regions 305 of the array 301, as represented by circular shapes. In one embodiment, the selected regions 305 onto which light is focused may be predetermined regions by the design of the optics. In another embodiment, the locations of the regions 305 may be determined and learn during a calibration phase. Additionally, disparity and manufacturing misalignments may be compensated for by learning of the locations of the regions 305.

The RG channel 302 may include an odd/even row decoder 306, a column decoder 307, an X-start register 308 and a Y-start register 309. It should be understood that the RG channel 302 includes the same components as the RG channels described in FIGS. 1A-1E. Each of the RG channels $302_1$-$302_{18}$ may include three TDCs ($TDC_1$-$TDC_3$). Each RG channel $302_1$-$302_{18}$ may also include other components, such as, but not limited to, intensity counters and a max intensity detectors similar to the example embodiment depicted in FIGS. 2A and 2B. The row odd/even decoder 306 may select particular pixel rows where RGPs 303 are located. For example, when an odd-numbered RGP row, i.e., RGP rows 1, 3, 5, etc., is selected, RGPs from odd-numbered rows are coupled to a corresponding RG channel by the row decoder 306. When an even-numbered RGP row, i.e., RGP rows 2, 4, 6, etc., is selected, RGPs from even-numbered rows are coupled to a corresponding RG channel by the row decoder 306. That is, odd-numbered RGP rows and even-numbered RGP rows are multiplexed to the RG channels. In another embodiment, the total number of RC channels $302_i$ equals the total number of odd-numbered RGP rows plus even-numbered RGP rows so there is no multiplexing involved.

The column decoder 307 may select particular pixel columns where RGPs 303 are located. The X-start register 308 and Y-start register 309 may respectively store row and column location information depending on whether odd- or even-numbered rows and columns are being addressed.

Although the organizational arrangement depicted in FIG. 3 is depicted from right to left, as opposed to the left-to-right organizational arrangement depicted in FIGS. 2A and 2B, the operational flow is the same in for organizational arrangements. That is, operational flow starts with the SPAD pixels and flows through the RG channel to provide intensity and peak value outputs (FIG. 1D).

In a first read cycle, the three RPGs 303 of all the odd-numbered RPG rows are respectively coupled to $TDC_1$-$TDC_3$ of a corresponding RG channel by the odd/even row decoder 306. For example, RGPs 303 in RGP columns 1, 11 and 21 of RGP row 1 are respectively coupled to $TDC_1$-$TDC_3$ of RG channel $302_1$. The RGPs 303 in columns 1, 11 and 21 of RGP row 1 are indicated at 310. Similarly, RGPs 303 in RGP columns 1, 11 and 21 of RGP row 3 are respectively coupled to $TDC_1$-$TDC_3$ of RG channel $302_2$, and so on for all 18 of the RG channels.

In a second read cycle, the three RPGs 303 of all the even-numbered RPG rows are respectively coupled to $TDC_1$-$TDC_3$ of a corresponding RG channel. For example, RGPs 303 in RGP columns 1, 11 and 21 of RGP row 2 are respectively coupled to TDC1-TDC3 of RG channel $302_1$. Similarly, RGPs 303 in RGP columns 1, 11 and 21 of RGP row 4 (not shown) are respectively coupled to $TDC_1$-$TDC_3$ of RG channel $302_2$, and so on for all 18 of the RG channels.

In a third read cycle, the next three RPGs 303 of all the odd-numbered RPG rows are respectively coupled to $TDC_1$-$TDC_3$ of a corresponding RG channel. More specifically, RGPs 303 in RGP columns 2, 12 and 22 of RGP row 1 are respectively coupled to TDC1-TDC3 of RG channel $302_1$. Similarly, RGPs 303 in RGP columns 2, 12 and 22 of RGP row 3 are respectively coupled to $TDC_1$-$TDC_3$ of RG channel $302_2$, and so on for all 18 of the RG channels.

In a fourth read cycle, the next three RPGs 303 of all the even-numbered RPG rows are respectively coupled to $TDC_1$-$TDC_3$ of a corresponding RG channel. For example, RGPs 303 in RGP columns 2, 12 and 22 of RGP row 2 are respectively coupled to $TDC_1$-$TDC_3$ of RG channel $302_1$. Similarly, RGPs 303 in RPG columns 2, 12 and 22 of RGP row 4 (not shown) are respectively coupled to $TDC_1$-$TDC_3$ of RG channel $302_2$, and so on for all 18 of the RG channels.

In a fifth read cycle, the next three RPGs 303 of all the odd-numbered RPG rows are respectively coupled to $TDC_1$-$TDC_3$ of a corresponding RG channel. More specifically, RGPs 303 in RGP columns 3, 13 and 23 of RGP row 1 are respectively coupled to $TDC_1$-$TDC_3$ of RG channel $302_1$. Similarly, RGPs 303 in RGP columns 3, 13 and 23 of RGP row 3 are respectively coupled to $TDC_1$-$TDC_3$ of RG channel $302_2$, and so on for all 18 of the RG channels.

The read cycles continue until all 30 columns of both the odd-numbered and even-numbered RGP rows have been read. For this example, there would be ten odd-numbered row read cycles, and ten even-numbered row read cycles. In one embodiment, the read cycles may be repeated, for example, a few hundred to a few thousand times, to provide filtering by averaging. In another embodiment, all of the odd-numbered RGP rows may be read before all of the even-numbered RGP rows are read.

It should be noted that the operational sequence for FIGS. 2A and 2B involves a sequence of column reads—three PRGs at a time—and in which all rows are read for each column sequence. The operational sequence for FIG. 3 also involves columns reads, but also involves an odd/even row reading sequence.

FIG. 4 depicts an electronic device 400 that includes a LiDAR system having a readout architecture that provides an automatic illuminated spot detection feature and that enables on-chip histogram and peak-intensity detection by using RG units according to the subject matter disclosed herein. The electronic device 400 may include a controller (or CPU) 410, an input/output device 420 such as, but not limited to, a keypad, a keyboard, a display, a touch-screen display, a camera, and/or an image sensor, a memory 430, an interface 440, a GPU 450, an imaging-processing unit 460, and a neural processing unit 470 that are coupled to each other through a bus 480. The controller 410 may include, for example, at least one microprocessor, at least one digital signal processor, at least one microcontroller, or the like. The memory 430 may be configured to store a command code to be used by the controller 410 or a user data.

Electronic device 400 and the various system components of electronic device 400 may include the image processing unit 460 that may include a LiDAR system having a readout architecture that provides an automatic illuminated spot detection feature and that enables on-chip histogram and peak-intensity detection by using RG units according to the subject matter disclosed herein. The interface 440 may be configured to include a wireless interface that is configured to transmit data to or receive data from a wireless communication network using a RF signal. The wireless interface 440 may include, for example, an antenna. The electronic system 400 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution—Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A Light Detection and Ranging (LiDAR) system, comprising:
   a Single Photo Avalanche Diode (SPAD) array comprising at least one pixel read group that outputs a detection event signal in response to a light pulse that is incident on the at least one pixel read group, the at least one pixel read group comprising two or more SPAD units; and
   a read group (RG) channel coupled to the at least one pixel read group, the RG channel comprising:
      a detection circuit configured to analyze a first intensity signal of a first SPAD unit of the at least one pixel read group in relation to a second intensity signal of a second SPAD unit of the at least one pixel read group, and
      a time-to-digital converter (TDC) configured to generate timestamp information based on a result of analyzing the first intensity signal in relation to the second intensity signal, the RG channel further configured to store the timestamp information in an accumulator bin of a histogram circuit corresponding to a value of the timestamp information using hard-wired addressing based on the value of the timestamp information.

2. The LiDAR system of claim 1, wherein:
   the SPAD array comprises M rows of pixel read groups and N columns of pixel read groups in which M and N comprise integers that are greater than 0, and each row of pixel read groups comprises K pixel read groups in which K comprises an integer that is greater than 0, and
   the LiDAR system further comprising M RG channels, each RG channel corresponding to a row of pixel read groups and generating timestamp information for L pixel read groups in the row of pixel read groups in which L comprises an integer that is greater than 0 and L≤K.

3. The LiDAR system of claim 1, wherein the SPAD array comprises M rows of pixel read groups and N columns of pixel read groups in which M and N comprise integers that are greater than 0, and each row of pixel read groups comprises K pixel read groups in which K comprises an integer that is greater than 0,
   the LiDAR system further comprising J RG channels in which J comprises an integer that is greater than 0 and J<M, each RG channel corresponding to at least one row of pixel read groups and generating timestamp information for L pixel read groups in the at least one row of pixel read groups in which L comprises an integer that is greater than 0 and L≤K.

4. The LiDAR system of claim 3, wherein J=M/2, and wherein the J RG channels generate timestamp information for pixel read groups in J=odd pixel read group rows and for pixel read groups in J=even pixel read group rows in alternating read cycles.

5. The LiDAR system of claim 1, wherein the SPAD array comprises M rows of pixel read groups and N columns of pixel read groups in which M and N comprise integers that are greater than 0, and each row of pixel read groups comprises K pixel read groups in which K comprises an integer that is greater than 0, the pixel read groups of the SPAD array being arranged in a zigzag pattern.

6. The LiDAR system of claim 1, wherein the detection circuit is configured to detect which SPAD unit of the at least one pixel read group outputs a largest intensity signal for the light pulse that is incident on the at least one pixel read group, and couple the largest intensity signal to the TDC of the RG channel.

7. The LiDAR system of claim 1, further comprising a peak-detection circuit configured to output an indication of the accumulator bin of the histogram circuit that stores a largest accumulation value.

8. The LiDAR system of claim 1, further comprising a correlation filter circuit at an input of the histogram circuit that is enabled based on an intensity of the detection event signal exceeding a predetermined threshold.

9. A Light Detection and Ranging (LiDAR) system, comprising:
an array of Single Photo Avalanche Diode (SPAD) units arranged in M rows of pixel read groups and N columns of pixel read groups, each row of pixel read groups comprising K pixel read groups in which M, N and K comprise integers that are greater than 0, each pixel read group being configured to output a detection event signal in response to a light pulse that is incident on the pixel read groups; and
J read group (RG) channels, each RG channel corresponding to at least one row of pixel read groups and comprising L time-to-digital converters (TDCs) that are respectively configured to generate timestamp information corresponding to detection event signals of each of L pixel read groups in the at least one row of pixel read groups in which J and L comprise integers that are greater than 0, J<M and L≤K, and each RG channel further configured to store the timestamp information in an accumulator bin of a histogram circuit corresponding to a value of the timestamp information using hardwired addressing based on the value of the timestamp information,
wherein an RG channel of the J RG channels is coupled to at least one pixel read group that includes two or more SPAD units, the RG channel comprising a detection circuit that is configured to detect which SPAD unit of the at least one pixel read group outputs a largest intensity signal for the light pulse that is incident on the at least one pixel read group and couple the largest intensity signal to a TDC of the RG channel.

10. The LiDAR system of claim 9, wherein J=M.

11. The LiDAR system of claim 9, wherein J=M/2, and wherein the J RG channels generate timestamp information for pixel read groups in J=odd pixel read group rows and for pixel read groups in J=even pixel read group rows in alternating read cycles.

12. The LiDAR system of claim 9, wherein the pixel read groups of the SPAD array are arranged in a zigzag pattern.

13. The LiDAR system of claim 9, further comprising a peak-detection circuit that is configured to output an indication of the accumulator bin of the histogram circuit that stores a largest accumulation value.

14. The LiDAR system of claim 9, further comprising a correlation filter circuit at an input of the histogram circuit that is enabled based on an intensity of the detection event signal exceeding a predetermined threshold.

15. A Light Detection and Ranging (LiDAR) system, comprising:

a Single Photo Avalanche Diode (SPAD) array comprising at least one pixel read group that outputs a detection event signal in response to a light pulse that is incident on the at least one pixel read group, the at least one pixel read group comprising two or more SPAD units; and
a read group (RG) channel coupled to the at least one pixel read group, the RG channel comprising:
a detection circuit configured to detect which SPAD unit of the at least one pixel read group outputs a largest intensity signal for the light pulse that is incident on the at least one pixel read group, and
a time-to-digital converter (TDC) that is configured to generate timestamp information corresponding to the largest intensity signal and store the timestamp information in an accumulator bin of a histogram circuit corresponding to a value of the timestamp information using hardwired addressing based on the value of the timestamp information.

16. The LiDAR system of claim 15, wherein the SPAD array comprises M rows of pixel read groups and N columns of pixel read groups in which M and N comprise integers that are greater than 0, and each row of pixel read groups comprises K pixel read groups in which K comprises an integer that is greater than 0, and
the LiDAR system further comprising M RG channels, each RG channel corresponding to a row of pixel read groups and generating timestamp information for L pixel read groups in the row of pixel read groups in which L comprises an integer that is greater than 0 and L≤K.

17. The LiDAR system of claim 15, wherein the SPAD array comprises M rows of pixel read groups and N columns of pixel read groups in which M and N comprise integers that are greater than 0, and each row of pixel read groups comprises K pixel read groups in which K comprises an integer that is greater than 0,
the LiDAR system further comprising J RG channels in which J comprises an integer that is greater than 0 and J<M, each RG channel corresponding to at least one row of pixel read groups and generating timestamp information for L pixel read groups in the at least one row of pixel read groups in which L comprises an integer that is greater than 0 and L≤K.

18. The LiDAR system of claim 17, wherein J=M/2, and wherein the J RG channels generate timestamp information for pixel read groups in J=odd pixel read group rows and for pixel read groups in J=even pixel read group rows in alternating read cycles.

19. The LiDAR system of claim 15, further comprising:
a peak-detection circuit configured to output an indication of the accumulator bin of the histogram circuit that stores a largest accumulation value; and
a correlation filter circuit at an input of the histogram circuit that is enabled based on an intensity of the detection event signal exceeding a predetermined threshold.

* * * * *